United States Patent
Defrance et al.

(10) Patent No.: US 9,467,449 B2
(45) Date of Patent: Oct. 11, 2016

(54) METHOD FOR PROTECTION OF DATA SHARED BETWEEN DEVICES CONNECTED IN A NETWORK AND CORRESPONDING APPARATUS

(71) Applicant: THOMSON LICENSING, Issy de Moulineaux (FR)

(72) Inventors: Serge Defrance, Rennes (FR); Thierry Tapie, Rennes (FR); Remy Gendrot, Montgermont (FR)

(73) Assignee: Thomson Licensing, Issy-les-Moulineaux (FR)

( * ) Notice: Subject to any disclaimer, the term of this patent is extended or adjusted under 35 U.S.C. 154(b) by 324 days.

(21) Appl. No.: 14/044,964

(22) Filed: Oct. 3, 2013

(65) Prior Publication Data

US 2014/0101728 A1    Apr. 10, 2014

(30) Foreign Application Priority Data

Oct. 4, 2012   (EP) .................................... 12306213

(51) Int. Cl.
| | |
|---|---|
| H04L 29/06 | (2006.01) |
| H04L 12/28 | (2006.01) |
| G06F 21/53 | (2013.01) |
| H04L 29/12 | (2006.01) |

(52) U.S. Cl.
CPC .............. *H04L 63/10* (2013.01); *G06F 21/53* (2013.01); *H04L 12/283* (2013.01); *H04L 12/2812* (2013.01); *H04L 12/2836* (2013.01); *H04L 61/2015* (2013.01)

(58) Field of Classification Search
CPC . H04L 63/10; H04L 12/2812; H04L 12/283; H04L 12/2836
See application file for complete search history.

(56) References Cited

U.S. PATENT DOCUMENTS

| | | | |
|---|---|---|---|
| 7,016,980 B1* | 3/2006 | Mayer et al. | ................. 709/249 |
| 7,707,618 B1 | 4/2010 | Cox et al. | |
| 8,074,276 B1 | 12/2011 | Beloussov et al. | |

(Continued)

FOREIGN PATENT DOCUMENTS

| | | |
|---|---|---|
| EP | 2065817 | 6/2009 |
| EP | 2 485 162 A1 | 8/2012 |

OTHER PUBLICATIONS

Duenas JC etal: "An end-to-end service provisioning scenario for the residential environment", IEEE communications magazine, IEEE service center, Piscataway, US, vol. 43, No. 9, Sep. 1, 2005, pp. 94-100, XP011139522, ISSN: 0163-6804, DOI: 10.1109/MCOM.2005.1509973.

(Continued)

*Primary Examiner* — Jeffrey Pwu
*Assistant Examiner* — Thong Truong
(74) *Attorney, Agent, or Firm* — Myers Wolin LLC (57) ABSTRACT

The invention proposes a method and device for protection of data for devices connected in a network such as a local area network or LAN. The method and device can for example be implemented on a gateway, which acts as an interconnecting device between the devices in the LAN network and that can offer these devices an access to an external network such as a wide area network or WAN. The method and device thus offers a protected environment for applications that are executed on the gateway, such as applications downloaded from the WAN. The method and device gives the applications executed on the gateway controlled access to the LAN resources in order to protect the data that the LAN devices share within the LAN, while giving the applications access to the WAN.

12 Claims, 5 Drawing Sheets

(56) References Cited

U.S. PATENT DOCUMENTS

| | | |
|---|---|---|
| 8,099,596 B1 | 1/2012 | Rusakov et al. |
| 2006/0209857 A1 | 9/2006 | Hicks, III |
| 2009/0168788 A1* | 7/2009 | Den et al. .................... 370/401 |
| 2010/0030819 A1* | 2/2010 | Srinivasan et al. ........... 707/201 |
| 2011/0295901 A9 | 12/2011 | Tormasov |

OTHER PUBLICATIONS

Search Report Dated Mar. 5, 2013.

Jun Ma et al., "Research of a Secure File System for Protection of Intellectual Property Right", The Ninth International Conference on Web-Age Information Management, DOI 10.1109/WAIM.2008.32, IEEE Copyright 2008, pp. 661-665.

* cited by examiner

United States Patent US 9,467,449 B2

METHOD FOR PROTECTION OF DATA SHARED BETWEEN DEVICES CONNECTED IN A NETWORK AND CORRESPONDING APPARATUS

This application claims the benefit, under 35 U.S.C. §119 of European Patent Application 12306213.5, filed Oct. 4, 2012.

1. FIELD OF INVENTION

The present invention generally relates to digital data storage and access, and more particularly, to a method and device for protection of data in a network.

2. TECHNICAL BACKGROUND

With the widespread deployment of user consumer devices and home appliances equipped with wired and wireless IP (Internet Protocol) based network interfaces, the home network has become a reality. The home network is heterogeneous, as it comprises CE (Consumer Electronic) devices, telephone sets, mass storage devices, personal computers and computer peripherals which use services provided by the devices in the home network and services provided on a WAN (Wide Area Network) such as the Internet. The home network is organized around an intermediate or interconnecting device called gateway, which offers the home network devices, interconnected in a LAN (Local Area Network) a function of network interface for access to both the home network and to the Internet. The home gateway thus plays a central role. Because of its central role, the home gateway is rarely being switched off. Due to its central position in the home network and its permanent availability, the home gateway is being attributed even more complex features. One of such complex features is described in European patent application EP 2 485 162 A1 published Aug. 8, 2012, and describes a method and device for sharing of data in a heterogeneous home network comprising a plurality of different devices with a plurality of different network resource sharing protocols and different file systems. The patent application describes how, through enhancing of the gateway's functions, each home network device is able to access data shared by the other network devices according its own network resource sharing protocol and 'seeing' shared data as if the shared data is part of its own file system.

As the gateway plays a key role and becomes more powerful and becomes a central point for sharing data in the home network, special attention must be given to data security, as the gateway becomes an entry point to the home network and to the data the home network devices share. The gateway's central role makes it an interesting target for hackers.

3. SUMMARY OF THE INVENTION

The present invention aims at alleviating some of the inconveniences of prior art, and in particular, some of those which are related to data security in the (local) network.

To this end, the invention comprises a method for protection of data shared between devices connected in a network, the method being implemented by an interconnecting device interconnecting the devices in the network, the interconnecting device being a central point for data sharing between the devices in the network, the interconnecting device exposing data shared by the devices in the network as directories of a file system of the interconnecting device that are mountable for the devices in the network, the method comprising a step of determining a set of devices in the network that a program to be executed by the interconnecting device is authorized to share data with; a step of launching a contained execution environment for execution of the program by the interconnecting device; a step of mounting of at least one of the directories of the file system of the interconnecting device in the contained execution environment, the at least one of the directories being chosen as a function of the determination; a step of executing the program in the contained execution environment by the interconnecting device.

According to a variant embodiment of the invention, the network is a local area network and said interconnecting device interconnects said local area network with a wide area network, and said method further comprises a step of downloading said program from said wide area network to said interconnecting device.

According to a variant embodiment of the method of the invention, the method further comprises a step of allocating to the contained execution environment an Internet Protocol address of an address space that is distinct from an address space used for allocating Internet Protocol addresses to the devices in the local area network, the distinct address space isolating the program in the contained execution environment from the devices in the local area network while allowing the program to communicate with the wide area network.

According to a variant embodiment of the method of the invention, the method further comprises a step of authenticating of the program for determining the set of devices in the local area network that the program is authorized to share data with.

According to a variant embodiment of the method of the invention, the allocating of Internet Protocol address to the contained execution environment is provided by a Dynamic Host Configuration Protocol.

According to a variant embodiment of the method of the invention, the method comprises a step of managing communication between the program and the devices in the local area network by a firewall.

The current invention also comprises a first device for protection of data shared between second devices connected in a network, the first device interconnecting the second devices in the network, the first device being a central point for data sharing between the second devices in the network, the first device exposing data shared by the second devices in the network as directories of a file system of the first device that are mountable for the second devices in the network, the first device comprising a determinator for determining a set of second devices in the network that a program to be executed by the first device is authorized to share data with; a program launcher for launching a contained execution environment for execution of the program by the first device; a directory mounter for mounting of at least one of the directories of the file system of the first device in the contained execution environment, the at least one of the directories being chosen as a function of the determination; a processor for executing the program in the contained execution environment by the first device.

According to a variant embodiment of the first device, the first device further comprises an address allocator for allocating to the contained execution environment an Internet Protocol address of an address space that is distinct from an address space for allocating Internet Protocol addresses to the second devices the network, the distinct address space isolating the program being executed in the contained execution environment from the local area network while allowing the program to communicate with the wide area network.

According to a variant embodiment of the first device, the first device further comprises means for authenticating of the program for determining the set of second devices in the local area network network that the program is authorized to share data with.

According to a variant embodiment of the first device, the first device further implements a Dynamic Host Configuration Protocol function for allocation of Internet Protocol addresses to the second devices in the local area network, and for allocation of an Internet Protocol address from a distinct address space to the contained execution environment.

According to a variant embodiment of the first device, the first device further comprises a firewall for managing of communication between the program and the second devices in the local area network.

4. LIST OF FIGURES

More advantages of the invention will appear through the description of particular, non-restricting embodiments of the invention. The embodiments will be described with reference to the following figures.

5. DETAILED DESCRIPTION OF THE INVENTION

In the following, the term 'mounting' is frequently used. According to Wikipedia: "Mounting takes place before a computer can use any kind of storage device (such as a hard drive, CD-ROM, or network share). The user or their operating system must make it accessible through the computer's file system. A user can only access files on mounted media". With the term 'mounting' in relation to the present invention is thus meant the operation of importing a directory of a shared file system by a container environment, or by a local area network device. This makes an 'exported' directory 'visible' or accessible to an application running in a container where the directory is mounted, or to an application running on a home network device, for example.

One of the possible applications that exploit enhanced functions of the gateway is the downloading of programs from the WAN (also referred to as 'the cloud'); the downloaded programs being destined for execution on the gateway. For example, the user may wish to download a photo indexing application that is capable of organizing the images stored by the devices in the home network, or a central heating manufacturer may wish to download a central heating monitoring- or management-application, with or without dongle inserted in the USB port of the gateway. As has been mentioned, the gateway's central role makes it an interesting target for hackers. The question is thus how to organize access to the home network devices in a secured way, allowing external applications or computer programs to be downloaded from the WAN and being executed in a safe way, without jeopardizing the integrity and privacy protection of the data stored and shared by the devices connected to the home network LAN. For the application downloaded from the WAN, a protected execution environment, called 'container' can add some security. The containerization consists in creating a virtual execution environment, giving the downloaded computer program access to shared folders and files, the downloaded application running inside the application container, preferably having its own IP address that is allocated from an address space that is separated from that used for attribution of IP addresses of the home network devices connected in the LAN. From inside the application container, the downloaded application is allowed to internally mount only some particular directories of shared data. These internal mounts consist in making visible inside the contained execution environment a predetermined part of the host tree structure. The solution of the invention protects against malicious use, i.e. any possibility to do mounts and exports cannot be misused to get undesired access to data available via the mounting points of the gateway. This is in contrast with a more radical solution that would be to forbid an application running in a container any access to mount directories and forbid the use of system calls, resulting in no possibility in data sharing between the downloaded application and the home network devices.

Figure 1:
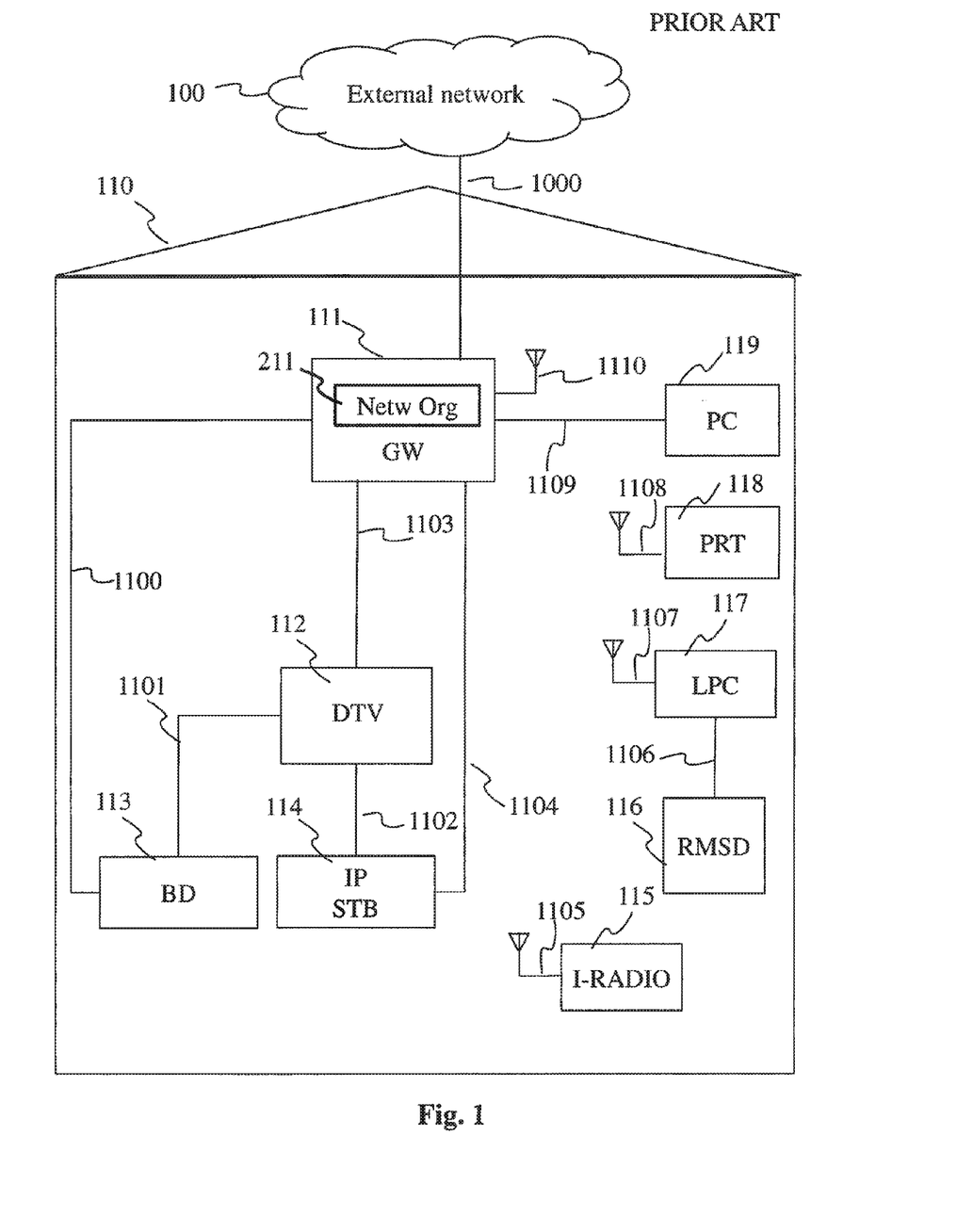
FIG. 1 is an example of a typical prior-art heterogeneous home network environment where the present invention can be implemented.

FIG. 1 is an example of a typical prior-art heterogeneous home network deployed in user premises 110. An ADSL (Asymmetric Digital Subscriber Line) 1000 connects the user premises to an external network such as the Internet 100. The prior-art home network comprises the following devices:

- a gateway (GW for Gateway) 111, interconnecting the devices in the home network via Ethernet links 1100, 1103, 1104 and 1109, WiFi link 1110, and being connected to the Internet via ADSL link 1000;
- a Blu-ray disc player (BD for Blu-ray Disc) 113 connected to the home network via Ethernet link 1100;
- a digital television 112 (DTV for Digital TeleVision) set with DLNA (Digital Living Network Alliance) connectivity via Ethernet link 1103;
- an Internet protocol television set top box 114 (IPTV STB), connected to the home network via Ethernet link 1104;
- an Internet radio 115 (I-RADIO), connected to the home network via WiFi link 1105;
- a laptop personal computer 117 (LPC), connected to the home network via WiFi link 1107;
- a removable mass storage device 116 (RMSD), connected to mobile personal computer 117 via USB link 1106;
- a personal computer 119 (PC) connected to the home network via Ethernet link 1109;
- a wireless printer 118 (PRT) connected to the home network via WiFi link 1108.

The typical prior-art home network of FIG. 1, is thus an assembly of devices that use different operating systems, for example: Windows, Linux, Mac OS, different data communication buses: HDMI, USB, Ethernet, WiFi, ADSL and different network resource sharing protocols (SMB (Server Message Block), CIFS (Common Internet File System), NFS (Network File System) allowing among others to share files with other network devices, which are or are not managed by the home network user. Some devices are capable of communicating together; DTV 112 with BD 113 and IPSTB 114 via HDMI connection 1101 respectively 1102 and DTV 112 with PC 119 via Ethernet, using the DLNA connectivity of the DTV 112 and communicating with an UPnP (Universal Plug and Play) server on PC 119.

The gateway 111 further comprises a network organizer 211 such as described by EP 2 485 162, that allows the home network devices to access the shares offered by other home network devices and to propose its own shares to the other home network devices.

When a home network device connects to the network organizer's web interface, the network organizer 211 in the gateway 111 obtains information on the new home network device in order to put into place network sharing. The directories that the new home network device proposes to share, are mounted locally on the gateway by the network organizer, and proposed, for example via the network organizer's web interface, to the other home network devices. The shared directories of the other home network devices (that are already mounted on the gateway) are automatically mounted on a local directory of the new home network device via a script in the network organizer's web interface that executes on the new home network device. The network organizer also does all protocol translations between different file systems of the different home network devices connected to the home network.

The network organizer thus ensures that each home network device wanting to share data within the home network has a connection with the gateway. Because realized at the file system level, this connection consists in an exchange of folders in the respective file system structure of the home network device and of the gateway. This is realized through mount/export of folders via the native communication protocol of the home network device. These mount/export operations are realized as soon as a home network device joins the home network. On the gateway, folders required for the mount/export operations, especially the ones used as mounting points, always exist even if the pending home network device is not connected to the home network. Indeed, a home network device (laptop PC 117 for instance) is not always connected to the home network. However, as soon as a home network device has been registered by the network organizer as being regularly connected to the home network, the folders where to mount on the gateway and its exported folders are reserved, i.e. they exist on the gateway. When the home network device is not connected, these folders are just pointing an empty folder (with just one file called "not-connected" to indicate that the device is not present). When the home network device connects later on, the mount is realized and the reserved folder points on the folder exported by the home network device.

Figure 2:
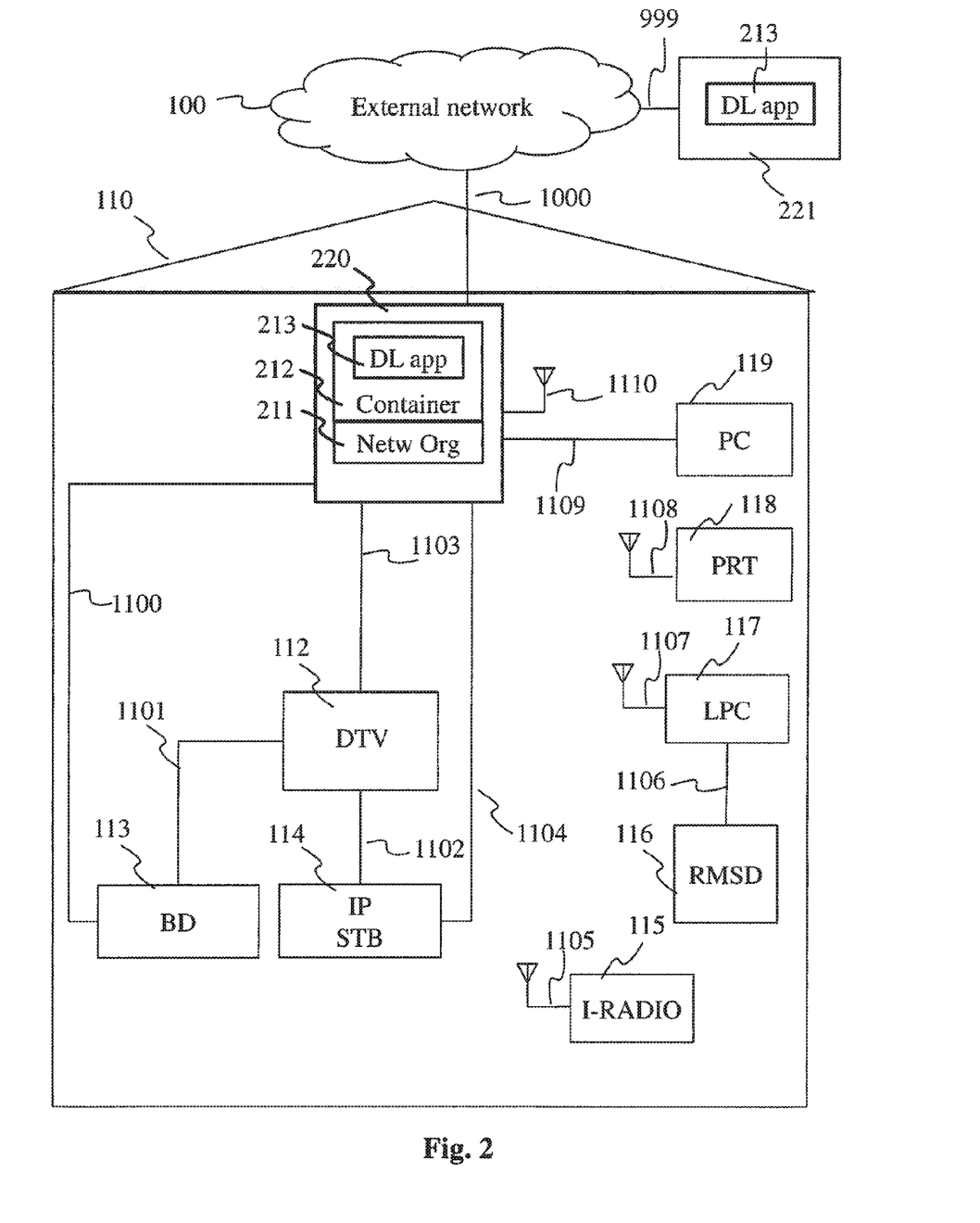
FIG. 2 is a non-limiting embodiment of the invention implemented in a typical heterogeneous home network as depicted in FIG. 1.

FIG. 2 is a non-limiting embodiment of the invention implemented in a typical heterogeneous home network as depicted in FIG. 1.

As was shown previously, a 'new' home network device that wants to access data shared by the other home network devices or that wants to share data with the other home network devices uses the services of the prior-art network organizer, instead of directly addressing itself to each concerned home network device. According to the present invention, the notion of device is extended to the previously discussed protected execution environment, i.e. an application container, in which applications downloaded from the Internet and running on the gateway can be securely executed. Such an application container is for example implemented at the operating system-level of the gateway implementing the invention. Applications (=computer programs) running inside the application container use the operating system's normal system call interface and do not need to be subject to emulation or run in an intermediate virtual machine.

The Linux container or LXC is a typical concrete example of a possible containerization. LXC is an operating system-level virtualization method for running multiple isolated Linux systems ("containers") on a single control host. LXC provides a virtual environment that has its own process and network space. LXC containers have their own root file system ("rootfs"), their own processes and their own network address space. By their network address space separation, the containers are thus separated in distinct networks. This feature can be used according to the invention in order to separate an application running in a container from the home network.

The method of the invention thus combines the advantages of the discussed application containerization and the 'network organizer' as disclosed by EP 2 485 162. Accesses from an application running inside an application container to devices in the home network are organized by the gateway, i.e. a part which is under control. FIG. 2 shows such an application 213 that is stored in a server 221, the server being connected to the Internet via link 999. The application 213 is downloaded on gateway 220 and is executed in an application container environment 212, and uses the services offered by the network organizer 211. According to the present invention, it is thus possible for the gateway 220 to decide to make visible or not any of the shared data folders to a downloaded application 213 that is executed in an application container environment 212. The gateway 220 decides which folders of the application container 212 to import and which folders of data shared by the other home network devices to export, the mount/export operations are now allowed in the application container. Any other folders of which mount/export is not allowed are out of scope to any application container and any access by an application 213 in an application container 220 will be refused. Returning to the previous example of LXC containers, the LXC container's "rootfs" is thus set up by the gateway before launch of the LXC container.

According to a variant embodiment of the method the application container 212 is isolated from the home network LAN as the application container has its own address space that is different from the address space used by the home network devices.

According to a variant embodiment of the invention, the determination of with which of the home network devices the downloaded computer program is authorized to share data with, is a function of an authentication of the computer program.

According to a variant embodiment of the invention, lists of shared data import/export directories mounted on the gateway to which an application container can be given access can be configured per application container. According to a variant embodiment, these lists of allowed directories are configured as a function of an authentication of the computer program, which determines which of the home network devices the downloaded computer program is allowed to share data with. According to a variant embodiment, these lists are read upon launching of the application container.

According to a variant embodiment of the invention, the mount/export operations that are allowed to the application container are done upon launching of the application container. Then, access to mount/export operations by an application in the application container can simply be prohibited, thus reinforcing the data security in the home network.

According to a variant embodiment of the invention, these mount/export operations that are done when the application container is launched are based on the mentioned lists. This way, automatic application container launch can be realized for trusted applications, e.g. after authentication. As mentioned above, as it is the gateway that creates the necessary folder needed for data sharing, it is not necessary for an application container when launched that a device exporting a data share is connected to the network for the data share to be mounted in the application container. In that case, the exported directory merely remains empty.

According to a variant embodiment of the invention, the intermediate device implements a Dynamic Host Configuration Protocol function for allocation of Internet Protocol addresses for the home network devices. The contained execution environment is being attributed a distinct Internet Protocol address by the DHCP function which allocated from an address space that is distinct from the address space used for allocation of IP addresses to home network devices. The distinct IP address allows the downloaded computer program running inside the contained execution environment to communicate with the external network, while being isolated from the home network. According to a variant embodiment, communication between the downloaded computer program and the home network devices is managed via a firewall.

Figure 3:
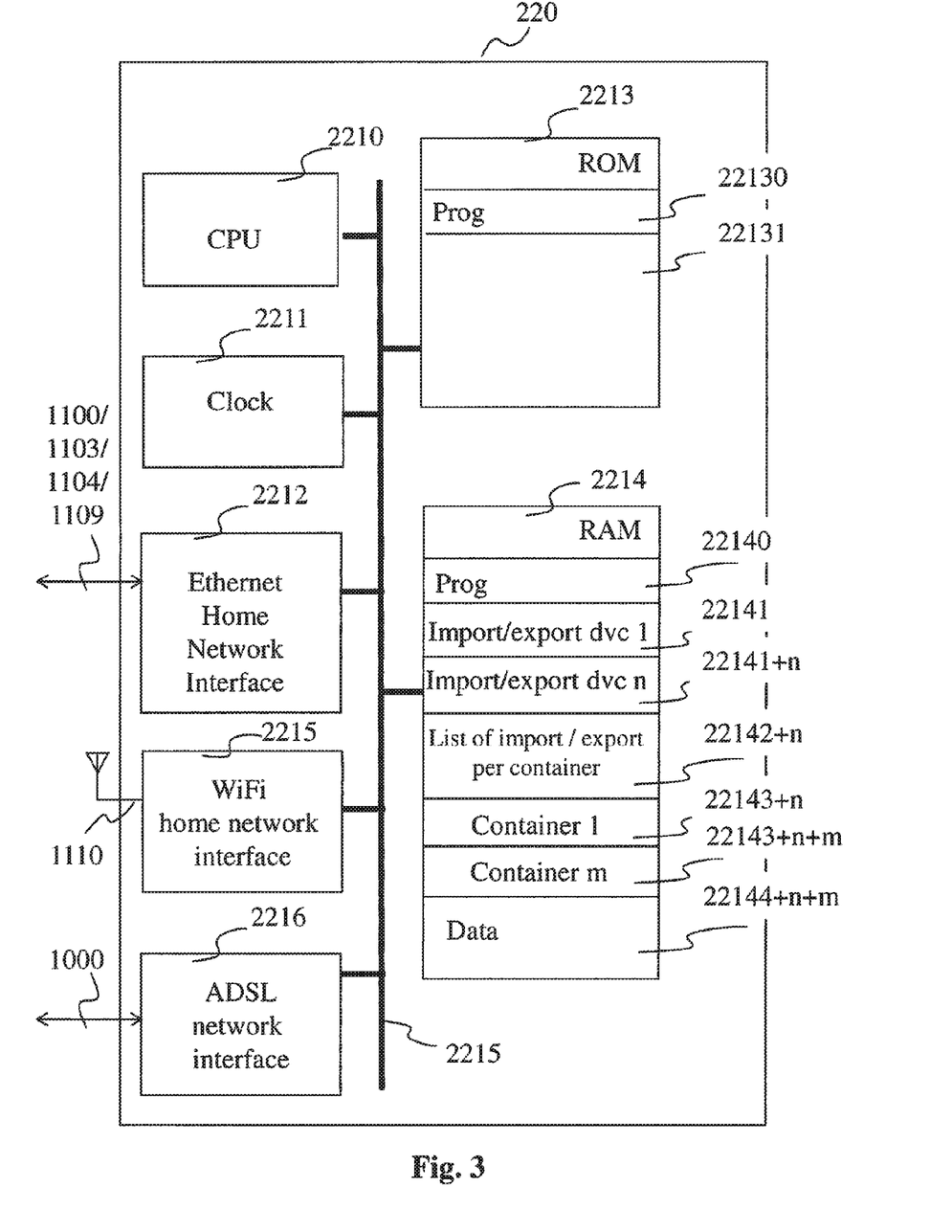
FIG. 3 is a non-limiting embodiment of a gateway device according to the invention, such as depicted in FIG. 2.

FIG. 3 is a non-limiting embodiment of a gateway device according to the invention, such as 220 of FIG. 2.

The gateway 220 comprises the following elements:
a central processing unit 2210 or CPU;
a clock unit 2211;
an Ethernet home network interface 2212, interconnecting the home network devices via the gateway using wired links;
a WiFi home network interface 2215, interconnecting the home network devices via the gateway using wireless link 1110;
an ADSL network interface 2216, interconnecting the home network devices and the gateway to the Internet network via link 1000;
a non-volatile memory ROM 2213; and
a volatile memory RAM 2214.

All of these components are interconnected via a data- and communication bus 2215. CPU 2210 controls the functioning of the device 220 according to a program that is stored in ROM 2213 in a memory zone 22130. Clock device 2211 provides the elements of gateway 220 with a common timing in order to sequence and synchronize their operation. Ethernet home network interface 2212 receives data from and transmits data to home network devices via wired links 1100, 1103, 1104 and 1109. Wifi home network interface 2215 receives data from and transmits data to home network devices via wireless links 1110. Memory zone 2213 comprises instructions that implement the method of the invention in memory zone 22130. Upon powering on of device 220, CPU 2210 copies the program 'Prog' stored in ROM 2213 memory zone 22130 into memory zone 22140 of RAM memory 2214, and executes the copied program. Upon execution of the copied program, the program allocates memory space for variables needed for its execution in memory 2214. The device 220 is now operational and upon download of an application from the Internet for execution in an application container in the gateway, the method of the invention is activated. Memory zones 22141 to 22143+n+m of RAM memory 2214 comprise space for storing data related to exportation and importation of home network devices data share directories for home network devices (22141 to 22141+n) and destined for application containers (22143+n to 22143+n+m). Memory zone 22142+n comprises a list of allowed import/export shares per application container.

RAM 2214 further comprises a data space 22144+n+m, comprising the file system of the gateway. Alternatively, this file system is implemented on a hard disk drive that is integrated into the gateway or attached to it.

Alternatively, at least some parts of RAM 2214 are implemented through an NVRAM (Non-volatile RAM) memory, thereby advantageously allowing these at least some parts of the RAM memory to be persistent with regard to power surges.

Figure 4:
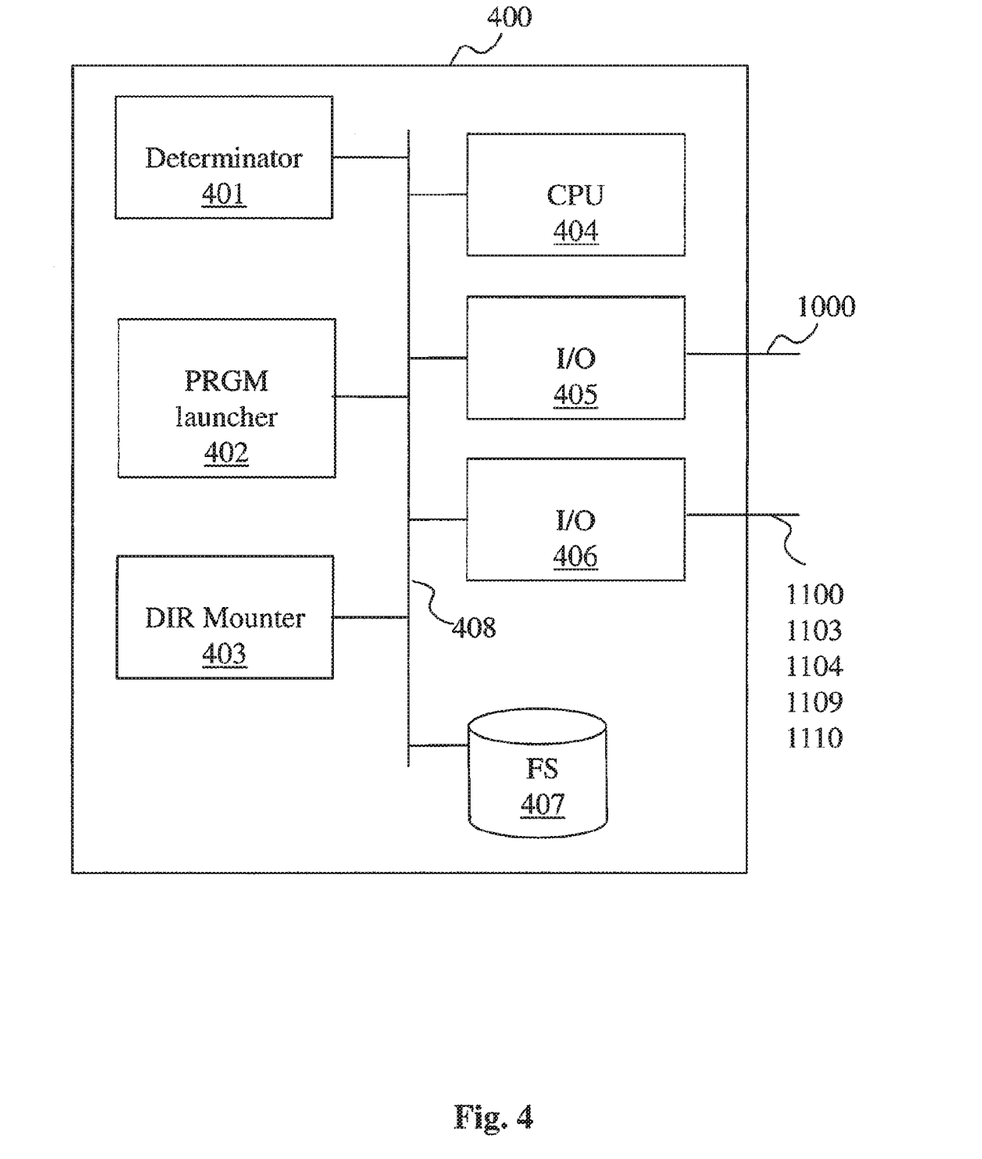
FIG. 4 is a non-limiting variant embodiment of an interconnecting device according to the invention.

FIG. 4 is a non-limiting variant embodiment of an interconnecting device according to the invention. A first device (400) protects data shared between second devices (see FIG. 2: 112, 113, 114, 115, 116, 117, 118, 119) connected in a network (see FIG. 2: 1100, 1103, 1104, 1109, 1110). The first device interconnects the second devices in the network, and is a central point for data sharing between the second devices in the network, the first device exposing data shared by the second devices in the network as directories of a file system (407) of the first device that are mountable for the second devices in the network. The first device comprises the following means:
a determinator (401) for determining a set of second devices in the network that a program (see FIG. 2: 213) to be executed by the first device is authorized to share data with; a program launcher (402) for launching a contained execution environment (see FIG. 2: 212) for execution of the program by the first device; a directory mounter (403) for mounting of at least one of the directories of the file system (407) of the first device in the contained execution environment, the at least one of the directories being chosen as a function of the determination; a processor (404) or CPU for executing the program in the contained execution environment by the first device. The device comprises further means to connect it to the network, such as an I/O interface (406), via connections (see also FIG. 2: 1100, 1103, 1104, 1109 and 1110, and optionally a second I/O interface (405), for connecting it to an external network (see FIG. 2: 100) such as WAN or Internet, via connection 1000.

Figure 5:
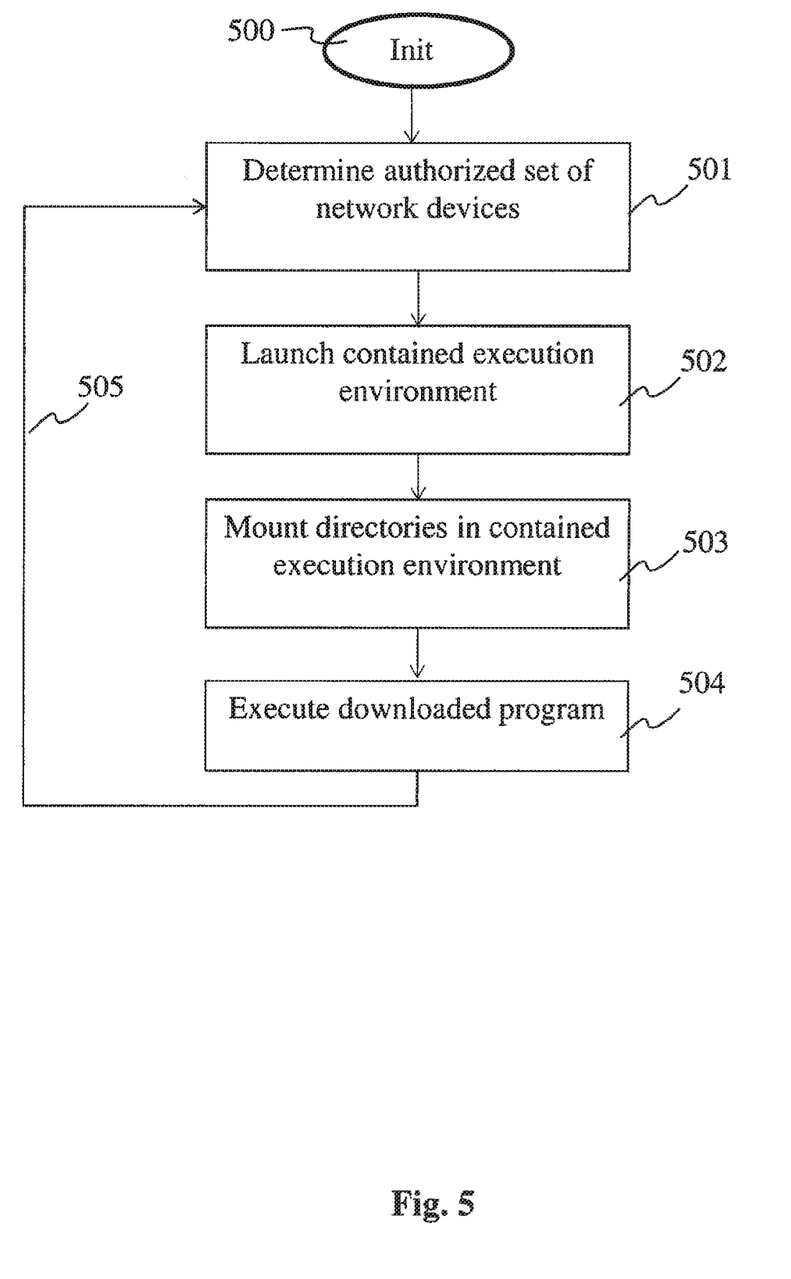
FIG. 5 is a logical diagram illustrating the steps of a non-limiting embodiment of the method of the invention.

FIG. 5 is a logical diagram illustrating the steps of a non-limiting embodiment of the method of the invention. The logical diagram illustrates the method for protection of data shared between network devices. This method is implemented by an intermediate device such as the gateway 220 of FIG. 2, interconnecting the network devices 112-119 in a local area network and connecting the network devices with a wide area network 100, the intermediate device 220 being a central point for data sharing between the network devices 112-119. The intermediate device exposes data shared by the network devices 112-119 as directories of a file system of the intermediate device 220 that are mountable for the network devices 112-119. In a first step of initialization 500, variables and memory zones needed for execution of the method are initialized. In a step 501, it is determined which set of network devices in the local area network a program to be executed by the intermediate device is authorized to share data with. The program is for example a javascript destined to be executed in a browser running on the intermediate device 220, a Java program or native binary code tailored for running on the hardware platform of the intermediate device 220. For example, a photo indexing application that is capable of organizing the images stored by the devices in the home network, or a central heating monitoring or management application. The determination in step 501 is for example according to a default setting, for example the program is authorized to share data with all 'public' directories published for network sharing by the network devices 112-119, or according to a setting determined by the administrator of the local area network. According to a variant embodiment, the set of network devices the program is authorized to share data with, is determined by a further authentication step (not shown), that is done using prior-art methods. In a next step 502, the contained execution environment for execution of the program is launched, and in a next step 503, one or more of the directories of the file system of the intermediate device 220 are mounted in the contained execution environment. The one or more the directories are being chosen as a function of the determination done in step 501 of the set of network devices in the local area network that the program is authorized to share data with. These internal mounts consist in making visible inside the contained execution environment the share directories on the intermediate device 220 that are determined in step 501. Then, in a next step 504, the program is executed in the launched contained execution environment. The method is iterated (arrow 505) upon reception of a new request for execution of a program on the intermediate device.

The network described in FIG. 2 is a mere example network in which the invention can be implemented. Other network configurations are possible while remaining compatible with the invention, comprising for example more than one user premise, with each one or more local networks. The architecture of the local network, in FIG. 2, may also be composed differently, according to the number of devices, the type of devices used, and/or the applications used. Likewise, the interfaces that are described for device 220 are Ethernet/WiFi and ADSL. However, the current invention is not limited to the use of Ethernet, WiFi, or ADSL technology. In FIG. 2 device 220 is represented as a distinct device, however implementation of the invention is not limited to implementation on a gateway or as a standalone device, the invention can also be implemented on a device connected to the home network, for example on a personal computer.

According to a particular non-limiting embodiment the invention, the gateway hosts the network organizer 220 that provides data sharing services to the devices in the home network. EP 2 485 162 also describes variant embodiments in which the network organizer is hosted by a proxy, in or outside of the gateway. Such variants are compatible with the current invention as the application container, being executed on the gateway, can use the services provided by the network organizer, even if the latter is physically located elsewhere.

Other types of intermediate devices than device 220 as illustrated by FIG. 2 are possible while still being compatible with the invention, such as a device with multiple processing units. Alternatively, the invention is implemented using a mix of hard- and software components, where dedicated hardware components relieve the CPU of the intermediate device of tasks that are alternatively executed in software to gain processing speed. According to a particular embodiment, the invention is entirely implemented in hardware, for example as a dedicated component (for example as an ASIC, FPGA or VLSI) (respectively « Application Specific Integrated Circuit», « Field-Programmable Gate Array» and « Very Large Scale Integration») or as distinct electronic components integrated in a device or in a form of a mix of hardware and software.

The invention claimed is:

1. A method for protection of data shared between network devices, wherein the method is implemented by an interconnecting device interconnecting the network devices, the interconnecting device being a central point for data sharing between the network devices, the interconnecting device making visible data stored by the network devices as directories of a file system of the interconnecting device that are accessible to the network devices, the method comprising:
   determining a set of network devices that a program to be executed by the interconnecting device is authorized to share data with;
   launching a contained execution environment for execution of the program by the interconnecting device;
   making visible at least one of the directories of the file system of the interconnecting device in the contained execution environment, each of the at least one of the directories of the file system in the interconnecting device pointing to a data storage directory of one of the network devices, the at least one of the directories being chosen as a function of the set of network devices; and
   executing the program in the contained execution environment by the interconnecting device.

2. The method according to claim 1, wherein said network is a local area network and said interconnecting device interconnects said local area network with a wide area network, and said method further comprises downloading said program from said wide area network to said interconnecting device.

3. The method according to claim 2, further comprising allocating to the contained execution environment an Internet Protocol address of a distinct address space different from an address space used for allocating Internet Protocol addresses to the network devices in the local area network, the distinct address space isolating the program in the contained execution environment from the network devices in the local area network while allowing the program to communicate with the wide area network.

4. The method according to claim 3, wherein the allocating of the Internet Protocol address to the contained execution environment is provided by a Dynamic Host Configuration Protocol.

5. The method according to claim 2, further comprising authenticating of the program for determining the set of network devices in the local area network that the program is authorized to share data with.

6. The method according to claim 2, further comprising managing communication between said program and the network devices in the local area network by a firewall.

7. An interconnecting device for protection of data shared between network devices, wherein the interconnecting device interconnects the network devices, the interconnecting device being a central point for data sharing between the network devices, the interconnecting device making visible data stored by the network devices as directories of a file system of the interconnecting device that are accessible to the network devices, the interconnecting device comprising a processor circuit coupled to a memory, the processor circuit being configured to:
   determine a set of network devices that a program to be executed by the interconnecting device is authorized to share data with;
   launch a contained execution environment for execution of the program by interconnecting device;

making visible at least one of the directories of the file system of the interconnecting device in the contained execution environment, each of the at least one of the directories of the file system in the interconnecting device pointing to a data storage directory of one of the network devices, the at least one of the directories being chosen as a function of the determined set of devices; and execute the program in the contained execution environment by the first interconnecting device.

8. The interconnecting device according to claim 7, wherein the network is a local area network and said interconnecting device interconnects said local area network with a wide area network, and the processor circuit is further configured to download said program from said wide area network.

9. The interconnecting device according to claim 8, wherein the processor circuit is further configured to allocate to the contained execution environment an Internet Protocol address of a distinct address space that different from an address space used for allocating Internet Protocol addresses to the network devices in the local area network, the distinct address space isolating the program in the contained execution environment from the network devices in the local area network while allowing the program to communicate with the wide area network.

10. The interconnecting device according to claim 8, wherein the processor circuit is further configured to authenticate the program and that determines the set of network devices in the local area network that the program is authorized to share data with.

11. The interconnecting device according to claim 8, wherein the processor circuit is further configured to implement a Dynamic Host Configuration Protocol function for allocation of Internet Protocol addresses to the network devices, and allocate an Internet Protocol address from a distinct address space to the contained execution environment.

12. The interconnecting device according to claim 8, wherein the processor circuit is further configured to manage communication between said program and the network devices.

* * * * *